US009813884B2

(12) United States Patent
Bennett (10) Patent No.: US 9,813,884 B2
(45) Date of Patent: Nov. 7, 2017

(54) MOBILE PHONE AS A HANDHELD RADIO TRANSMITTER AND RECEIVER OVER NON-CELLULAR RADIO FREQUENCY CHANNELS

(71) Applicant: World Emergency Network—Nevada Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 0 days.

(21) Appl. No.: 14/946,072

(22) Filed: Nov. 19, 2015

(65) Prior Publication Data

US 2016/0142895 A1     May 19, 2016

Related U.S. Application Data

(60) Provisional application No. 62/081,821, filed on Nov. 19, 2014.

(51) Int. Cl.
*H04M 11/04* (2006.01)
*H04W 4/22* (2009.01)
(Continued)

(52) U.S. Cl.
CPC .......... *H04W 4/22* (2013.01); *H04W 76/007* (2013.01); *H04W 88/06* (2013.01)

(58) Field of Classification Search
CPC ....... H04W 84/18; H04W 12/12; H04W 4/16; H04W 8/245; H04W 88/06; H04L 29/08108; H04M 1/72519
(Continued)

(56) References Cited

U.S. PATENT DOCUMENTS 5,555,286 A * 9/1996 Tendler ............. H04M 1/72519
                                                   379/355.03
5,822,682 A * 10/1998 Schroderus ........... H04W 84/08
                                                         370/260

(Continued)

OTHER PUBLICATIONS

Twisted Pair Solutions, Inc., "WAVE Enables LMR Communications Access to Everyone, Using Their Preferred Devices," 2014, 1 Page, [online] [Retrieved on Nov. 22, 2016] [Archived on web.archive.org on Sep. 21, 2014] Retrieved from the internet <URL:http://web.archive.org/web/20140921230903/http://www.twistpair.com/index/extend-lmr-to-mobile-and-pcs>.

*Primary Examiner* — Steve D Agosta
(74) *Attorney, Agent, or Firm* — Fenwick & West LLP (57) ABSTRACT

A system enables a device such as a mobile phone to operate as a transmitter and receiver over non-cellular radio frequencies such as very-high frequency (VHF) and ultra-high frequency (UHF) not natively compatible with the mobile phone. The system includes a radio appliance coupled to a radio that receives and transmits information over non-cellular radio frequencies. The radio appliance provides an interface between the radio and a web appliance accessible on a network such as the internet. The radio appliance receives information in broadcast from the radio and transmits the information to the web appliance over the network. The web appliance provides mobile devices access to the information received from the radio appliance, such as audio that was broadcast, over the network. Additionally, the web appliance may receive information from the mobile phone for transmission to the radio appliance and subsequent broadcast by the radio.

18 Claims, 7 Drawing Sheets

(51) Int. Cl.
*H04W 76/00* (2009.01)
*H04W 88/06* (2009.01)

(58) Field of Classification Search
USPC .. 455/41.2, 41.3, 410, 414.1, 417, 418–420, 455/550, 552.1, 553.1; 370/310.2, 312, 370/328, 338
See application file for complete search history.

(56) References Cited

U.S. PATENT DOCUMENTS

| | | | | |
|---|---|---|---|---|
| 5,845,283 | A | * | 12/1998 | Williams .......... G06F 17/30569 |
| 6,097,938 | A | * | 8/2000 | Paxson ............... H04L 63/0492 455/410 |
| 6,185,205 | B1 | * | 2/2001 | Sharrit .................... H04L 29/06 370/389 |
| 7,496,360 | B2 | * | 2/2009 | Sindhwani ............ H04W 88/06 370/310 |
| 2007/0121561 | A1 | * | 5/2007 | Yashar .............. H04L 29/06027 370/338 |
| 2007/0173196 | A1 | * | 7/2007 | Gallic .................... H04H 20/62 455/3.06 |
| 2008/0045256 | A1 | * | 2/2008 | Wang ...................... H04W 4/16 455/518 |
| 2009/0180403 | A1 | * | 7/2009 | Tudosoiu ............... H04B 1/006 370/278 |
| 2009/0249418 | A1 | * | 10/2009 | Alastruey Gracia ............... H04N 7/17318 725/114 |

\* cited by examiner

MOBILE PHONE AS A HANDHELD RADIO TRANSMITTER AND RECEIVER OVER NON-CELLULAR RADIO FREQUENCY CHANNELS

CROSS REFERENCE TO RELATED APPLICATIONS

This application claims the benefit of U.S. Provisional Application No. 62/081,821 filed Nov. 19, 2014, which is incorporated by reference in its entirety.

BACKGROUND

1. Field of Art

The present disclosure generally relates to the field of communications and more specifically to enabling a mobile phone to transmit and receive on non-cellular radio frequency channels.

2. Background of the Invention

Non-cellular radio frequencies such as very-high frequency (VHF) and ultra-high frequency (UHF) are used for police as well as citizen, aviation, maritime, military, and first responder communication. While mobile phones, police and maritime, etc. radios all operate on the same basic principles of radio frequency ("RF") communication, each are tuned to communicate within their reserved frequency band or range of frequencies, which are intentionally kept separate to avoid collisions and interference. Mobile phones for example operate on distinctive frequencies such as 1900 MHz GSM and 800 MHz CDMA, separate from those of the maritime distress channel (156.8 MHz) and the digital police band (700 MHz). This design has advantages. For example, during a wide-scale emergency event where cellular communication experience high-congestion, police radios operating on separate frequencies are not impacted. However, a prime disadvantage is that radio bands are not interoperable with each other. For example, a police officer cannot utilize a police radio in their patrol car to communicate with a mobile phone, or vise versa. In another example, a recreational boater could not use their mobile phone to broadcast over a maritime distress channel in an emergency situation.

While these difficulties are discussed with respect to a police department and maritime distress signaling, private entities (e.g., a business utilizing two-way radios) and other entities (e.g., Fire departments and emergency medical services) may face similar difficulties.

BRIEF DESCRIPTION OF THE DRAWINGS

The teachings of the embodiments can be readily understood by considering the following detailed description in conjunction with the accompanying drawings.

DETAILED DESCRIPTION

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Embodiments of a system described herein enable a mobile phone to operate as a transmitter and receiver over non-cellular radio frequencies such as very-high frequency (VHF) and ultra-high frequency (UHF) used for police as well as citizen, aviation, maritime, military, and first responder communication. A radio appliance is coupled to a radio that receives and transmits information over non-cellular radio frequencies. The radio appliance provides an interface between the radio and one or more devices on a network. For example, the radio appliance may provide an interface between the radio and a web appliance. The radio receives wireless broadcasts and the information in the broadcasts is passed to the radio appliance.

The radio appliance transmits the information received from the radio to the web appliance over its network connection. In turn, wireless and wired devices with network capabilities may access the web appliance to obtain the information, such as listen to audio that was broadcast or view transcripts thereof. Additionally, the web appliance may receive information from the devices that access the web appliance for broadcast by the radio. For example, a mobile phone accessing the web appliance may provide an audio recording or establish a real-time audio channel with the web appliance to provide audio. The web appliance, in turn, transmits the information to the radio appliance, which transmits the received information in a radio broadcast by way of the interface with the radio.

Thus, embodiments of the system enable a mobile phone, for example, that operates on distinctive frequencies such as 1900 MHz GSM and 800 MHz CDMA, separate from those of the maritime distress channel (156.8 MHz) and the digital police band (700 MHz), to communicate on these frequencies. Furthermore, because the web appliance is accessible over a network, such as the internet, the mobile phone can be used communicate on these other frequencies irrespective of location. Consider, for example, a police officer whose duties take him beyond the operating area of his station, and thus locations where a radio in his police cruiser does not facilitate communications with the station. In such a scenario, the police officer could utilize his mobile phone to communicate through the station radio irrespective of his location. In another example, a recreational boater not outfitted with a maritime radio could use their mobile phone to broadcast over a maritime distress channel in an emergency situation. Such a broadcast may be advantageous to receiving help promptly rather than dialing 911 or similar.

Operational Environment

Figure 1A:
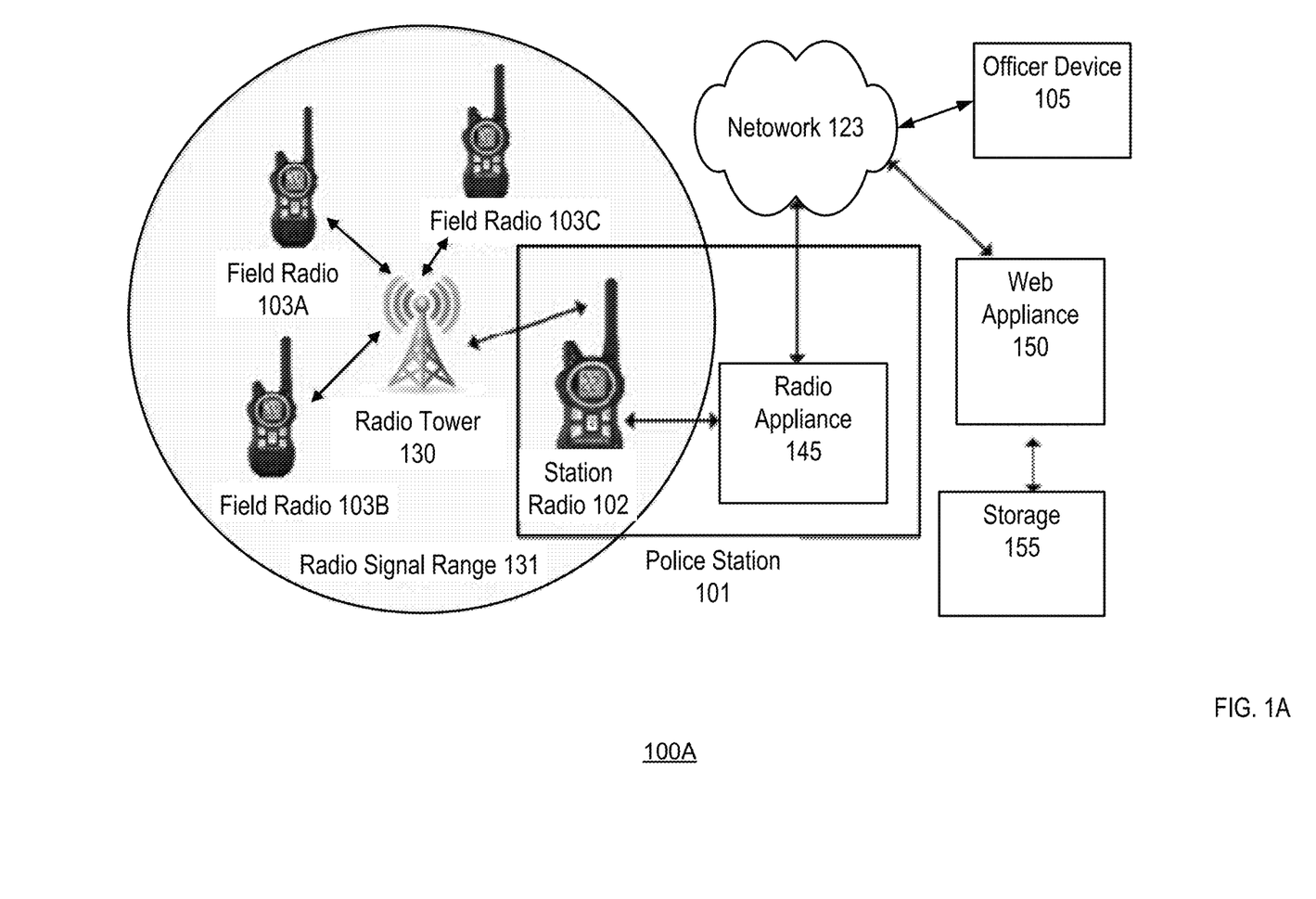
FIG. 1A is a block diagram illustrating an environment 100A for implementing handheld radio transmitter and receiver over non-cellular radio frequency channels, according to one example embodiment.

FIG. 1A is a block diagram illustrating an environment 100A for implementing handheld radio transmitter and receiver over non-cellular radio frequency channels, according to one example embodiment. As shown, the environment 100A includes a network 123 such as the internet connecting a radio appliance 145, web appliance 150, and officer device 105. The radio appliance 145 serves as the interface between a radio, such as station radio 102 within a police station 101, and the network 123. A similar configuration could be utilized in a fire station, an emergency medical service center, etc.

The station radio 102 receives radio signals from, and transmits radio signals to field radios 103. In some embodiments, a radio tower 130 may facilitate the transmission and receipt of radio signals within its radio signal range 131 between the station radio 102 and field radios 103. Furthermore, the station radio 102 may be of a same or similar type as the field radios, such as those within a police cruiser.

The station radio 102 may receive information from a radio operator within the police station 101 and transmit the information to the field radios 103. Additionally, the station radio 102 receives information from the radio appliance 145 and transmits the information to the field radios 103. The station radio 102 also receives information transmitted by the field radios 103. In many instances, the information is voice audio. In some embodiments, the information may be audible tones or digital data transmissions, depending on radio 102 capabilities.

As stated above, the radio appliance 145 may provide information to the station radio 102 for transmission to the field devices 103. The radio appliance 145 provides the information to the station radio 102 by way of a connection with the station radio 102. Additionally, the radio appliance 145 receives, by way of the connection with the station radio 102, the information the station radio 102 receives from transmissions by the field radios 103 and the radio operator within the police station 101. The appliance 145 is connected with the web appliance 150, such as through a wireless or wired network 123 connection, which can be the internet. In turn, the appliance 145 receives information for transmission via the station radio 102 from the web appliance 150 and transmits information received via the station radio 102 to the web appliance 150. In one embodiment the radio appliance 145 includes one or more processors and a non-transitory computer-readable storage medium storing computer program code to perform the operations described herein. Additionally, the radio appliance 145 may include various ports and/or network capabilities including wired and wireless to form the connections described herein.

Thus, the radio appliance 145 provides an interface between the web appliance 150 and the station radio 102. In turn, an officer device 105 may utilize the web appliance 150 to communicate with the field radios 103. Although the web appliance 150 is illustrated outside of the police station 101, the web appliance 150 and radio appliance 145 may be co-located within the police station 101.

In one embodiment, the radio appliance 145 is a network 123 connected processing device capable of receiving information such as audio data (e.g., over the network 123 from a web appliance 150) and processes the information for transmission via the station radio 102. In turn, the radio appliance 145 interfaces with a traditional station radio 102 to transmit the received information to field radios 103 over the appropriate radio frequency. In practice, the web appliance 150 may receive the information passed to the radio appliance 145 from an officer device 105 over a network 123 connection. The officer device 105 may connect to the network 123 via a provider that provides mobile data service to the officer device 105 or via a WiFi internet connection to provide information to the web appliance 150 for transmission.

In one embodiment, the radio appliance 145 interfaces with the traditional station radio 102 to receive information in radio frequency broadcasts from radios 103 in the field and information for radio broadcast input by a radio operator of the station radio 102. Using radio frequency audio information as an example, the radio appliance 145 in turn transmits the RF audio received from the station radio 102 over the network 123 to the web appliance 150. The web appliance 150 may catalog and store the received RF audio information by channel (e.g., according to associated frequency), time, and location in storage 155. Additionally, the web appliance 150 may relay audio information received from the radio appliance 145 to one or more internet connected devices, such as a mobile officer device 105.

The web appliance 150 represents a collection of compute devices (e.g., servers) and related storage mediums (e.g., storage 155) that are configured for performing various activities such as exchanging data over the network 123 with officer devices 105 and radio appliances 145, cataloging and storing data (e.g., in storage 155) in support of one or more agencies such as police station 101 and facilitating communications between personnel utilizing a mobile device (e.g., officer device 105) and radios 103 in the field. For example, the web appliance 150 may include one or more modules providing ascribed functionality to officer devices 105 via an application programming interface ("API") or web interface, and radio appliance 145 via a radio appliance interface, as described in more detail with reference to FIG. 3. The web appliance 150 interfaces may also include infrastructure for providing audio data communicability between the radio appliance 145 and/or officer device 105 using protocols such as voice over internet protocol ("VoIP"), WebRTC, or other Real-time Transport Protocol (RTP) connection over a network 123 such as the internet.

The officer device 105 is oftentimes a mobile telephonic device capable of collecting data and transmitting data (e.g., wirelessly) over the network 123. Some examples of an officer device 105 include a mobile phone, tablet or notebook computer. Thus, the officer device 105 may include one or more processors and a non-transitory computer-readable storage medium storing computer program code to perform the operations described herein. Additionally, the officer device 105 may include various ports and/or network capabilities including wired and wireless to form the connections described herein as well as a display to generate user interface and hardware buttons and/or a touch screen display to receive user input. Example embodiments of the officer device 105 as a mobile phone include feature phones, smart phones, etc. Accordingly, a given mobile phone or other device operated as an officer device 105 may not necessarily include or support all of the functionality ascribed herein to the officer device or system due to inherent differences in device capabilities.

In one embodiment, the officer device 105 executes a radio application to facilitate the transmission and receipt of data over the network 123 to/from the web appliance 150. In other embodiments, the officer device 105 may execute a browser application to facilitate the transmission and receipt of data over the network 123 to/from the web appliance 150, such as by loading a web interface of the web appliance through the browser application. An example embodiment of an officer device 105 is described in more detail with reference to FIG. 4.

Figure 1B:
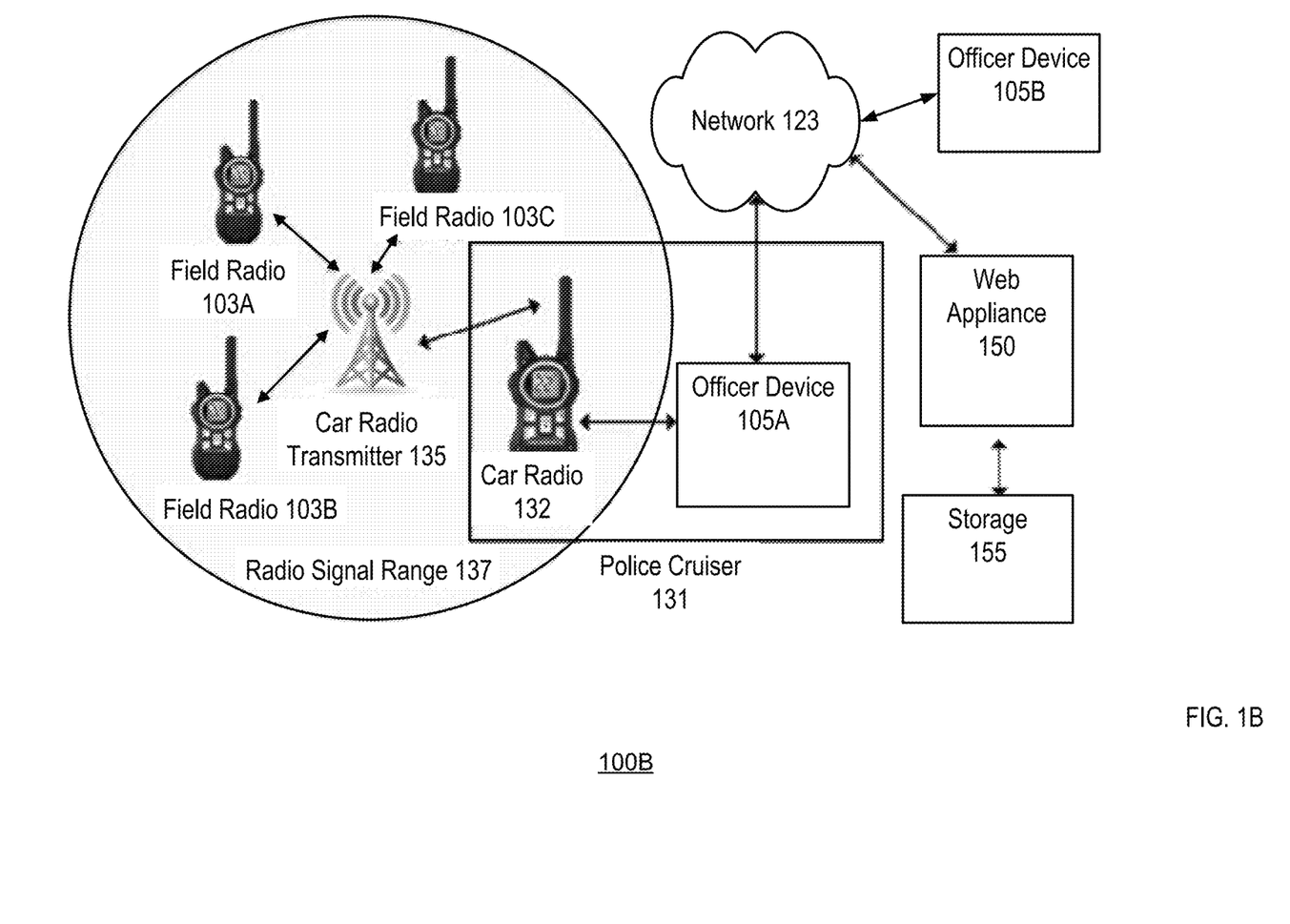
FIG. 1B is a block diagram illustrating an environment 100B for implementing a handheld radio transmitter and receiver over non-cellular radio frequency channels, according to one example embodiment.

FIG. 1B is a block diagram illustrating an environment 100B for implementing a handheld radio transmitter and receiver over non-cellular radio frequency channels, according to one example embodiment. The system described thus far (i.e., in FIG. 1A) suggests that a dedicated hardware radio appliance is connected to a station radio at a police station or other non-mobile location to facilitate communications between field radios 103 and mobile officer devices 105. However, many circumstances require a mobile configuration. While a hardware radio appliance like that discussed previously could be configured for mobile use, such as in a police cruiser, this would require issuance of the hardware prior to need. Additionally, for example, in a crisis negotiation such as a hostage scenario on-scene at a suspect's home, a short-range private-channel configuration may be desirable. The configuration in environment 100B differs from that of environment 100A in that an officer device is configured to provide radio appliance functionality in the field.

As shown, the environment 100B includes a network 123 connecting an officer device 105A, web appliance 150, and officer device 105B. Rather than utilizing a dedicated radio appliance as in FIG. 1A, officer device 105A may be configured to provide functionality similar to that of the radio appliance when connected to a car radio 132 in a police cruiser 131. In this instance, the officer device 105A serves as the interface between a radio, such as car radio 132 within the police cruiser 131, and the network 123. In an example implementation, the officer utilizing device 105A may tune the vehicle-mounted radio 132 connected to a car radio transmitter 135 to a short-range private channel with a radio signal range 137 that covers the vicinity of where the hostage crisis is taking place—but not back to the police station, for example.

With respect to a hostage negotiation scenario, a field radio 103A may be provided to the suspect by first responding officers, which may utilize field radios 103B, 103C to listen/communicate with the suspect. Typically, a hostage negotiator is called to the scene. However, the hostage negotiator may be unable to monitor the situation until in the vicinity of the crisis (e.g., within radio signal range 137). To facilitate off-site monitoring, an officer on-site may connect the officer device 105A with the car radio 132 and configure the officer device 105A with the web appliance 150. In turn, the officer device 105A receives radio frequency transmissions via connection with the car radio 132 and transmits the received radio frequency information to the web appliance 150, which catalogs and stores the information in storage 155. Accordingly, an off-site hostage negotiator may utilize officer device 105B to access the web appliance 150 and receive the information to monitor the crisis situation.

Additionally, in some embodiments, the off-site hostage negotiator may utilize officer device 105B to transmit information such as audio data to the web appliance 150 for transmission to officer device 105A. The officer device 105A may be configured to receive the information from the web appliance 150 and playback the audio. Thus, for example, the officer utilizing the officer device 105A may receive instructions (e.g., via voice audio or text) from the off-site hostage negotiator. In the case of receiving voice audio instructions, the officer device 105A may be configured to playback audio received from the web appliance 150 locally, e.g., via its speaker, connected speaker, or headphones. Accordingly, the officer on-site could utilize their field radio (e.g., 103B) or car radio 132 to communicate with the subject in possession of field radio 103 based on the negotiator's instructions. In turn, because the officer device 105A receives the communications via the car radio 132 and transmits the audio to the web appliance 150, the off-site negotiator can monitor how the on-site officer effected the instructions with officer device 105B.

The network 123 represents the communication pathway between officer devices 105, the web appliance 150, and/or radio appliance 145. In one embodiment, the network 123 includes standard communications technologies and/or protocols and can include the Internet and PSTN. Oftentimes, these communications technologies and/or protocols carry both PSTN and Internet related data. Thus, the network 123 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 123 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 123 can be represented using technologies and/or formats including analog audio (e.g., for last mile PSTN communications), digital audio and video (e.g., as a file or streaming with Real Time Streaming Protocol, VoIP, WebRTC, or other Real-time Transport Protocol), the hypertext markup language (HTML), the extensible markup language (XML), JavaScript, VBScript, FLASH, the portable document format (PDF), etc. In addition, all or some of the data exchanged over the network 123 can be encrypted using conventional encryption technologies such as secure sockets layer (SSL), transport layer security (TLS), virtual private networks (VPNs), Internet Protocol security (IPsec), etc. In another embodiment, the entities on the network 123 can use custom and/or dedicated data communications technologies instead of, or in addition to, the ones described above. For example, some government agencies and the military may operate networks auxiliary to the internet and PSTN.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

Radio Appliance

Figure 2A:
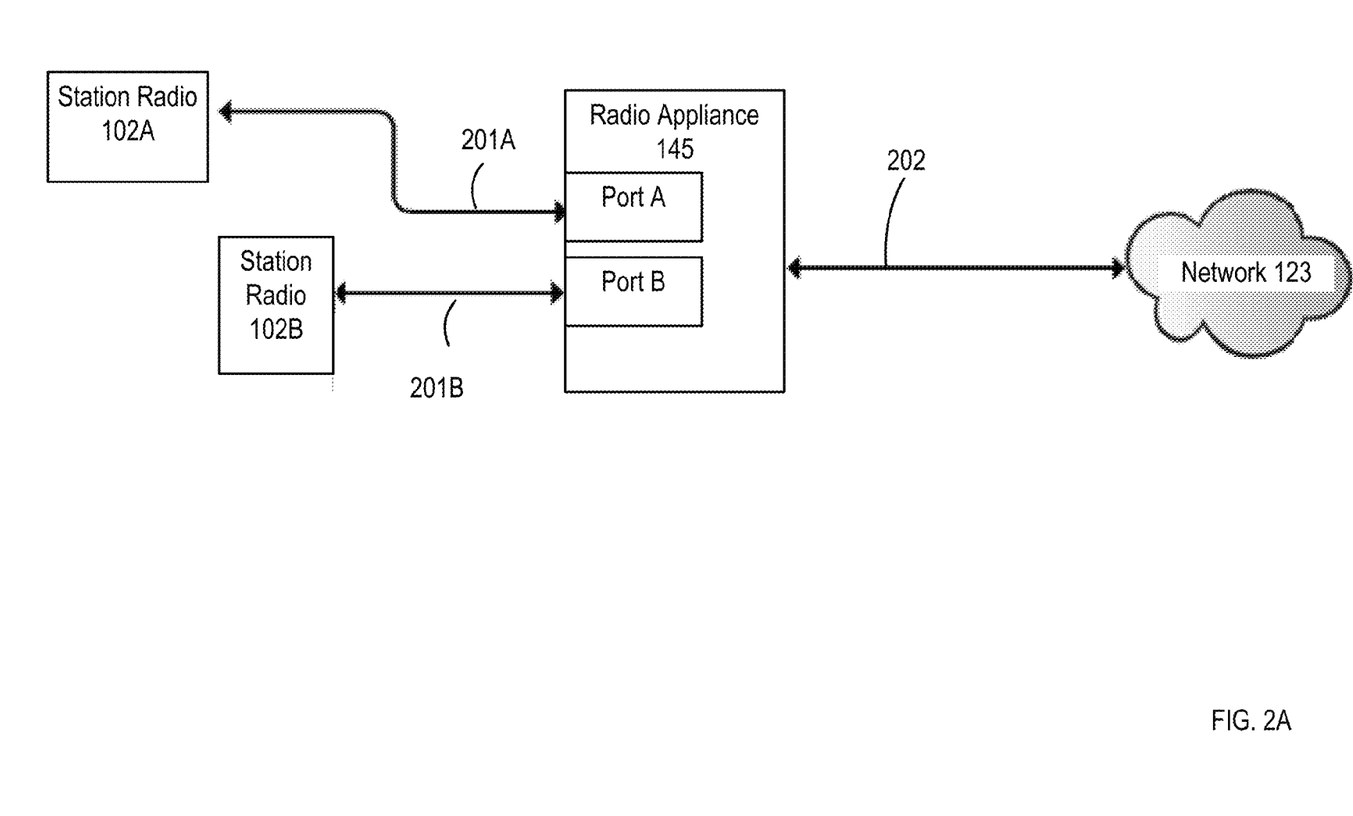
FIG. 2A illustrates example configurations of a radio appliance for implementing a handheld radio transmitter and receiver over non-cellular radio frequency channels, according to various embodiments.

FIG. 2A illustrates example configurations of a radio appliance 145 for implementing a handheld radio transmitter and receiver over non-cellular radio frequency channels, according to various embodiments. As described above, the radio appliance 145 provides an interface between a station radio 102 and network 123, such that mobile devices with network 123 access may receive and transmit radio frequency information from station radio 102.

The radio appliance 145 is connected to station radio 102A via connection 201A. The connection 201A may be formed with a cable such as by a cable with a microphone/headphone jack or similar. Accordingly, in one embodiment, one end of the cable forming connection 201A is coupled with the microphone/headphone input port of the station radio 102A. For example, the station radio 102A may include in input port reserved for an external headset/microphone, such as an in-ear or lapel microphone for hands-free operation, to receive the jack of the cable. The radio appliance 145 may include a similar port to receive a microphone/headphone jack at the other end of the cable to form the connection 201A. For example, the radio appliance 145 may include a female microphone/headphone port, like the station radio 102A, and connection 201A may be formed by inserting one end of a male-to-male microphone/headphone cable into the station radio 102A external headset/microphone port and the other end into a radio port of the radio appliance 145. Other male/female cable types and connections may be formed as required for a specific application.

The connection 201A between the radio appliance 145 and station radio 102A may carry one or more types of information. For a typical station radio 102A, to perform a RF broadcast, the operator of the station radio 102A triggers a Push-To-Talk (or Transmit) button and begins transmitting (e.g., by speaking into a microphone). When the operator desires to stop broadcasting, the PTT button is released. Accordingly, the radio appliance 145 may generate a PTT trigger signal, which is passed over connection 201A to the station radio 102A to perform an RF broadcast. In turn, the radio appliance 145 transmits information, such as audio, over the connection 201A to broadcast the information in RF via the station radio 102. The radio appliance 145 then ceases to generate the PTT trigger signal to stop broadcasting via the station radio 102A. In embodiments where a microphone/headphone cable is utilized to form connection 201A, the cable can carry audio information between the radio appliance 145 and the station radio 102A as well as the PTT trigger signal from the radio appliance 145 to the station radio 102A. Other configurations may utilize an additional cable to carry the PTT trigger signal and/or other information. Thus, for example, in either instance, the radio appliance 145 may receive information for broadcast and generate the PTT signal for the duration required to transmit the received information to the station radio 102A for broadcast.

The radio appliance 145 also connects to network 123 via connection 202. In one embodiment, connection 202 is formed via an Ethernet cable that couples the radio appliance 145 to a network appliance (not shown) such as a router, modem, switch, server, etc. that provides devices with network 123 access. In other embodiments, the radio appliance 145 may form connection 202 with the network appliance wirelessly, such as via WiFi, Bluetooth, etc. In either instance, the network appliance (not shown) enables the radio appliance 145 to send/receive data over the network 123 so that the radio appliance 145 can communicate with the web appliance 150.

In some embodiments, the radio appliance 145 may include multiple radio ports, i.e., Port A and Port B in a two port configuration, to receive and transmit over two or more station radios 102A, 102B. For example, station radio 102A may be coupled to a port A of the radio appliance 145, station radio 102B to port B of the radio appliance, and so on. This configuration is beneficial in areas where agencies utilize different radios for different purposes. For example, in areas near the ocean, a police station may have both a police band station radio 102A as well as a maritime band station radio 102B. Additionally, this configuration is beneficial in instances where one station radio 102A is tuned to one channel (e.g., non-emergency), and another station radio 102B to another channel (e.g., emergency).

In multiple port-configuration, the radio appliance 145 may handle each connection 201 separately. For example, the radio appliance 145 may tag the information received from each port for transmission to the web appliance such that the web appliance can discern which port the radio appliance received from the information from. Additionally, the radio appliance 145 may read a tag in information received from the web appliance to determine which port the received information should be output on.

In configurations where a station radio 102 is tunable via a channel input signal, the radio appliance 145 may generate and transmit the channel input signal corresponding to the desired channel via connection 201 to cause the station radio to tune to a specific channel. In some embodiments, this connection may be formed via a separate communications port on the station radio 102 and corresponding port on the radio appliance 145 to send a desired channel selection. In some embodiments, the radio appliance 145 may also receive a channel indication signal from the station radio 102 via the connection, the channel indication signal indicates which channel the station radio 102 is currently tuned to. The radio appliance 145 may receive a channel selection from the web appliance for configuring the station radio 102 to the specified channel and transmit a channel indication received from the station radio 102 to the web appliance.

Figure 2B:
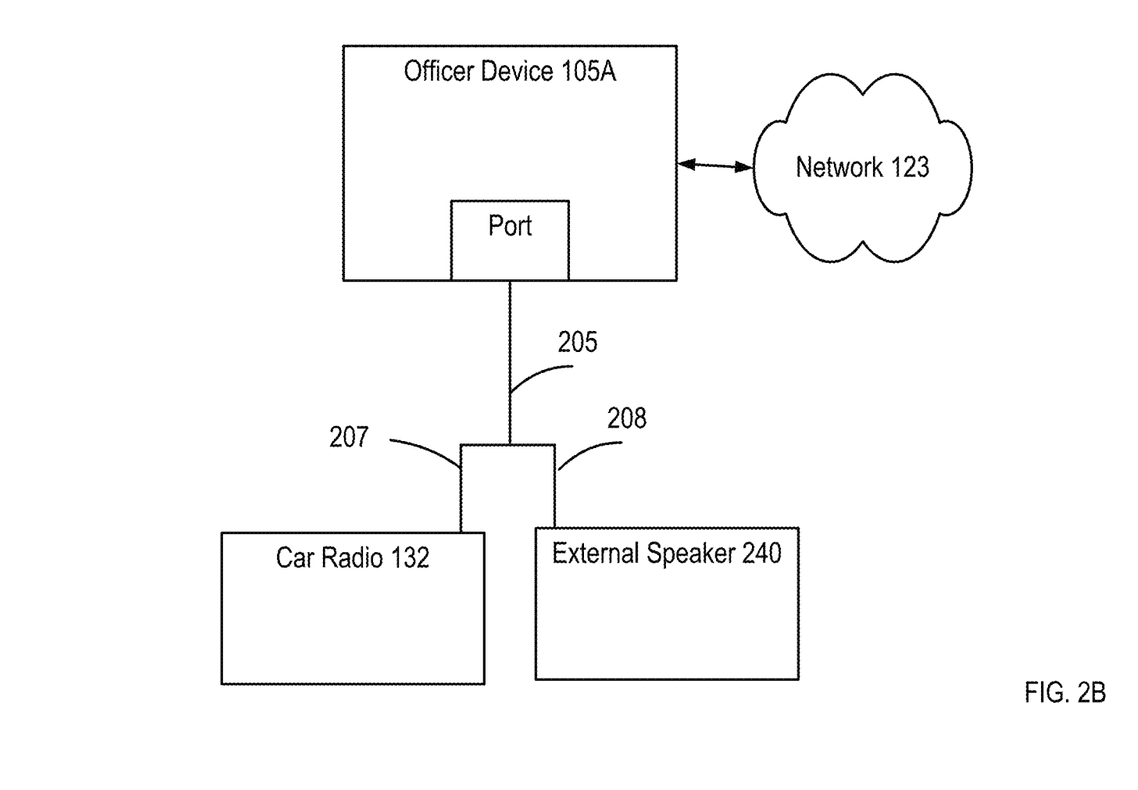
FIG. 2B illustrates an example configurations of a mobile device, such as officer device configured as a radio appliance for implementing a handheld radio receiver over non-cellular radio frequency channels, according to various embodiments.

FIG. 2B illustrates an example configurations of a mobile device, such as officer device 105 configured as a radio appliance for implementing a handheld radio receiver over non-cellular radio frequency channels, according to various embodiments. As described above, a user may connect a mobile device such as officer device 105A to a radio in the field. For example, an officer may connect their officer device 105A to a car radio 132 in their police cruiser for sending and receiving RF communication in the field. The officer device 105A, when connected to the car radio 132, receives the RF broadcast audio from the car radio 132 and transmits the audio over the network 123 to the web appliance (not shown). In turn, one or more other officer devices (not shown) may monitor the RF broadcasts. Additionally, in some embodiments the other officer devices monitoring the RF broadcasts may communicate with the user of officer device 105A by transmitting audio to the web appliance, which then passes the audio to the officer device 105A.

As shown, the officer device 105A includes a port for establishing a connection with the car radio 205. For example, similar to the radio appliance, the officer device 105A may include a headphone/microphone port. Accordingly, a connection 205 may be formed at the officer device 105A utilizing a cable with a headphone/microphone jack. Similarly, a connection 207 may be formed with the car radio by utilizing a cable with a headphone/microphone jack at the opposite end and inserted into the headphone/microphone port of the car radio 132, like that of the station radio. In turn, the officer device 105A receives the audio from the car radio 132.

However, in some instances, when connection 205 is formed using the port of the officer device 105A, the officer device 105A may disable a speaker for emitting sound. In other instances, where the native speaker is not disabled, an auxiliary audio speaker may be desired to increase audio output volume. In one embodiment, the cable for forming the connections 205, 207 with the officer device 105A and the car radio 132 includes an additional end for forming a connection 208 with an external speaker 240. Thus, for example, as shown in FIG. 2B, a first connection 205 of the cable couples to the mobile device (e.g., via coupling of male cable end to female port) for receiving audio from and outputting audio to different devices. In one embodiment, the cable further includes a pigtail to form a second connection 207 and a third connection 208, both of which are coupled to the first connection 205 of the cable.

The second connection 207 is made to the car radio 132 for passing RF communication information from the car radio 132 to the officer device 105A via the first connection 205. The third connection 208 is made to the external speaker 240 for playback of audio received at the officer device 105A. In one embodiment, the first connection 205 has two channels, such as an incoming channel and outgoing channel, which are utilized from existing left and right audio channels of the port of the officer device 105A. Thus, the second connection 207 may couple the car radio 132 to the incoming channel (e.g., the right channel) to pass audio from the car radio to the officer device 105A and the third connection 208 may couple the external speaker 240 to the outgoing channel (e.g., the left channel) such that the officer device 105A may output audio to the external speaker 240. The outgoing audio passed to the external speaker through connection 208 may include the audio received at the officer device 105A from the car radio 132 via connection 207 as well as other audio to be output by the officer device 105A. For example, the officer device 105A may receive audio for output from the web appliance. In one embodiment, a radio application on the officer device 105A manages the input and output channels of the port to receive audio from the car radio 132 on the incoming channel and output the received audio from the car radio, as well as the other audio, on the outgoing channel.

Web Appliance

Figure 3:
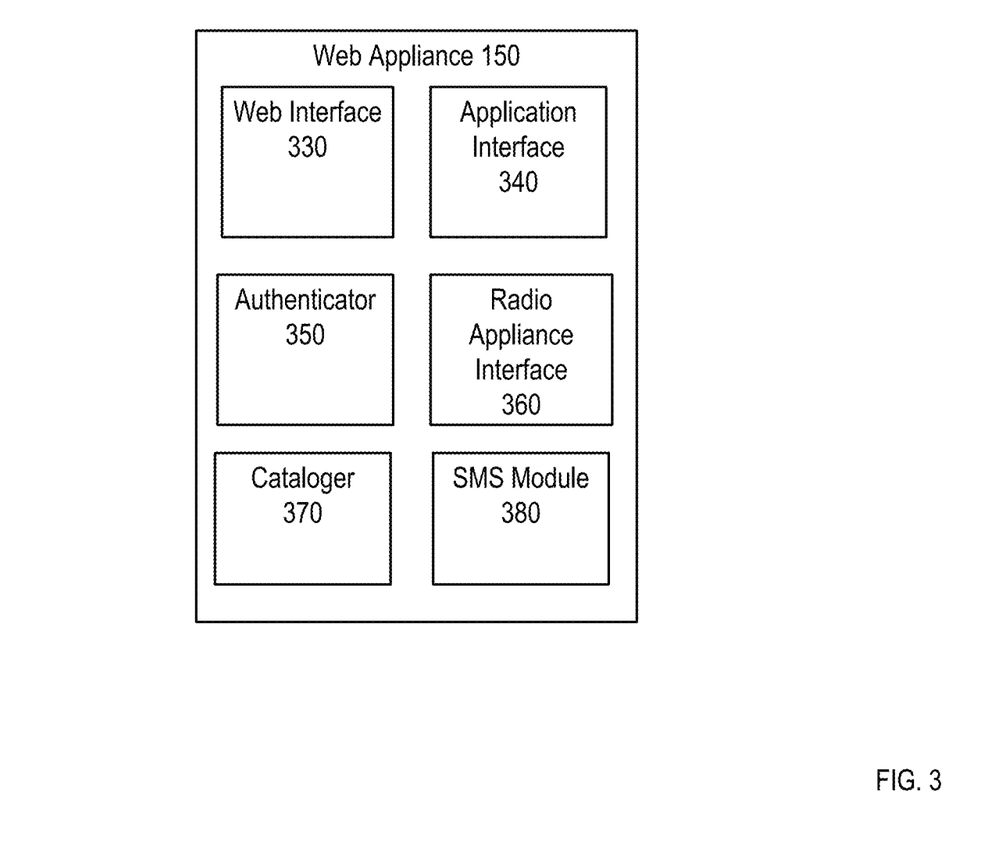
FIG. 3 is a block diagram illustrating example modules of a web appliance according to one example embodiment.

FIG. 3 is a block diagram illustrating example modules of a web appliance 150 according to one example embodiment. As mentioned above, the web appliance 150 receives transmissions over a network from the radio appliance 145 and/or officer device 105A configured as a radio appliance. The transmissions received over the network from the radio appliance include, for example, the RF broadcast audio collected by the radio appliance from a station radio or car radio. In turn, an officer device may access the web appliance 150 via the network to receive the transmissions in real-time and/or those the web appliance 150 catalogs and stores in storage. Additionally, the web appliance 150 may receive information from the officer device over the network for transmission back to the radio appliance.

As shown, the web appliance 150 includes multiple modules, such as a web interface 330, application interface 340, authenticator 350, radio appliance interface 360, cataloger 370, and SMS module 380. In some embodiments, the functions are distributed among the modules in a different manner than described herein. Other embodiments have additional and/or other modules.

The web interface 330 module provides an online web interface, such as in a webpage, to devices accessing the web appliance 150 over the network. For example, the web interface 330 may be accessible through a web browser. The web interface 330 provides an interface with options for a mobile device such as an officer device to receive radio broadcast information passed to the web appliance 150 by a radio appliance and to provide information through the web interface 330 which the web appliance 150 passes to the radio appliance for radio broadcast.

In one embodiment, the web interface 330 is a web portal for an administrator of a radio appliance to manage network access of the radio communications flowing through the radio appliance. For example, a user with administrator privileges may monitor and regulate officer device network access to inbound/outbound communications on the one or more radios coupled to the radio appliance. In one embodiment, the web interface 330 provides officer devices with access to the communications flowing through a radio appliance and the ability to provide information for transmission via the radio connected to the radio appliance.

The web interface 330 may provide administrators and/or officer devices with one or more options such as: selecting a radio/channel from radios/channels for which communications have been received from radio appliances; changing a channel of a selected radio; playback of audio from a radio/channel including pausing, rewinding, fast-forwarding, and resuming live audio; and playback of information submitted (e.g., by an officer device) via the web interface 330 for radio broadcast. Additional features may include a mapping of the locations corresponding to officer devices when they submitted information to the web interface 330 for transmission. Further, a user with administrator privileges may permit and revoke device access to a particular radio appliance, radio, and/or channel tunable by the radio as well as review details associated with the device such as the user's name, emergency contact information, badge number, etc. to permit or deny access.

In practice for example, a user of an officer device browses to a webpage provided by the web interface 330 module, such as via an HTTP server. The webpage provides options for the user to select between different channels, radios, locations, etc. to monitor through the browser on the officer device. Once the user has navigated to a desired radio/channel, the user may review communications associated with the radio/channel. In instances where the user or officer device has permission to transmit, the web interface 330 may provide a virtual PTT button within the webpage, which the user may engage to begin submitting audio for broadcast by the radio on the desired channel and disengage to end the submission. Additionally, the web interface 330 may provide channel specific transmit functions such as to create a distress signal with location (e.g., by requesting the device's determined GPS position) or other broadcast. In some embodiments, rather than requiring the user to speak while holding the PTT button to submit a transmission, the web interface 330 may enable the office device to submit an audio file or submit written text, which the web appliance 150 translates from text to speech prior to transmission.

The application interface 340 provides similar functionality to administrators and users as that of the web interface 330 described above. However, whereas the web interface 330 provides access via browser applications, the application interface 340 includes an application programming interface (API) for exchanging information with a radio application installed to a device, such as an officer device. Thus, a user may utilize a radio application installed to their device rather than navigating to a webpage through a browser to communicate over the network with the web appliance 150. In some embodiments, the application interface 340 pushes notifications and information to the radio application as well as receive information (e.g., for transmission) through the application.

In practice for example, the application interface 340 may process requests from the radio application for information about different channels, radios, locations, etc. available for a user to monitor through the radio application on the officer device. In turn, the application interface 340 transmits the requested information to the radio application for display to the user. In instances where the user or officer device has permission to transmit, the application interface 340 may establish a VoIP or other real-time audio connection to the office device to receive audio in read-time for broadcast by the radio on the desired channel. Alternatively, the application interface 340 may receive an audio file generated by the radio application. Additionally, the application interface 340 may receive information from the radio application associated with channel specific transmit functions such as the user's selection of a distress signal with the device's determined GPS position or other broadcast. The application interface 340 may also receive text submitted through the radio application for text to speech analysis and broadcast.

The authenticator 350 manages monitoring and transmission privileges for devices accessing the web appliance 150 via either the web interface 330 or the application interface 340. For example, some radio networks, such as a police dispatch channel, only allow authorized individuals, like police officers, to transmit. To prevent unauthorized individuals from transmitting over these restricted channels, an administrator of a radio appliance connected to the radio may wish to restrict monitoring and/or transmitting capabilities of unauthorized devices. The administrator may provide the preferences for a particular radio appliance, radio, and/or channel through the web interface 330 and/or the application interface 340. The authenticator stores administrator preferences for one or more radio appliances, radios, and channels along with authentication information (if any) specified buy the administrator for permitting monitoring and transmitting of other users' devices.

In one embodiment, the authenticator 350 receives authentication information associated with a device requesting to access the web interface 330 and/or application interface 340 subsequent to installation of the radio application on the device. The authentication information may include an authorization code, provided by the administrator, that permits an officer (or other) device to access information associated with and/or transmit information on one or more radios connected to a radio appliance and the channels associated with the one or more radios. The authenticator 305 may determine which, if any, radios/channels a devices is permitted access to based on the authentication information. For example, the authenticator 350 may receive and authorization code in the authentication information and determine which radios/channels have a matching authorization code and the privileges the authorization code grants the device for each radio/channel.

In certain applications, a user or device may have permission to transmit on some channels, but can only listen to others. For example, a Miami police officer may have permission to transmit over the Miami dispatch channel, but only listen to the neighboring Fort Lauderdale dispatch channel. Granular permissions may be altered and maintained in the authenticator 350 by administrators for users/devices having provided a valid authorization code through interfaces 330, 340 to modify which channel(s) and permissions a given user is allowed access to. Thus, for example, in an emergency situation where police officers from neighboring towns are called to respond, such as a school shooting in Fort Lauderdale, that same Miami police officer may be granted transmission permissions temporarily by the Fort Lauderdale Police Department through interface 330, 340. In a specific example illustrating the benefits of the system, the Miami police officer's radio may not work in neighboring Fort Lauderdale and the system configurations described herein provides a means for the Miami police officer to use their mobile phone (e.g., officer device) to communicate with Fort Lauderdale officers via radio broadcast.

The authenticator 350 may also monitor other factors for permitting devices monitoring/transmitting privileges on a radio/channel. For example, radios are generally limited in that they can only communicate with other radios in range. This is beneficial to users that desire to prevent interference from users in other locations transmitting on similar frequencies. For example, the Coast Guard in San Diego does not want to receive radio transmissions from boaters in Miami. One means of recreating this functionality for devices accessing the web interface 330 and/or the application interface 340 is to establish a geofence for a particular radio/channel. A geofence establishes a geographic location within which the authenticator 350 may grant a device access to a particular radio/channel through the web interface 330 and/or application interface 340. For example, the authenticator 350 may request a GPS location from a device and check the reported GPS location against the geofence specified for a radio/channel the device requests to access. In turn, the authenticator 350 may deny all access or restrict transmit privileges if the device's reported GPS location falls outside the geofence. The authenticator 350 may restrict information received for transmission via the SMS module 380 in a similar fashion. In instances where the information received for transmission via the SMS module 380 is a distress signal, the authenticator 350 may authorize the transmission on a radio tuned (or tunable) to the appropriate channel nearest to the reported location of the device reported in the message received by the SMS module 380. In turn, the radio appliance interface 360 transmits the information for broadcast on the radio that the authenticator 350 authorized.

The radio appliance interface 360 receives information from one or more radio appliances and provides the received information to the cataloger 370. The received information may include audio and other broadcast data, channel the data was received on, and/or radio port on which the information was collected by the radio appliance, and a network address (e.g., IP, MAC, etc.) of the radio appliance. The received information is passed to the cataloger 370 for organization, storage, and access via the web interface 330 and/or application interface 340.

The radio application interface 360 may also receive information for transmission to a radio appliance from the web interface 330, application interface 340, and/or the SMS module 380. The information received for transmission may include audio and other data for broadcast and the radio/channel to broadcast the data through. In order to transmit the information to the radio appliance, the radio appliance interface 360 identifies the stored network address information for the radio appliance associated with the radio and, if applicable, which port of the radio appliance the radio is connected to. In turn, the radio appliance interface 360 transmits the audio and other data for broadcast, channel to broadcast the data on (if applicable), and radio port of the radio at the appliance (if applicable) to the network address (e.g., IP, MAC, etc.) of the radio appliance.

In some embodiments, the radio application interface 360 manages a queue for broadcast information bound for a radio appliance. In many traditional radio communications, only one party can transmit at a time. For example, if the PTT button is active on radio A and the user is speaking, a user of another radio B will receive an error tone if the PTT button is activated to transmit at the same time. Queuing avoids these collisions and provides the added convenience of not having to wait for a silent line to queue a transmission from a mobile device for broadcast. Queuing is especially important here because it is possible that audio streamed back to the mobile device is received on a small delay (whereas traditional radios have near-zero delay). Thus, when the user hears silence and activates a PTT button to provide audio to the web appliance for broadcast (thinking it's clear to talk), the user may in fact cause the radio that will broadcast the audio to attempt to talk over another broadcast.

The radio appliance interface 360 may mange the queue by detecting when a radio channel is not silent. If the radio appliance interface 360 receives information for broadcast on a busy channel from the web interface 330, application interface 340, and/or SMS module 380, the radio appliance interface 360 schedules the transmissions to the corresponding radio appliance in first in, first out order, and initiates the first transmission in the queue to the radio appliance upon detective the radio channel is silent.

The SMS module 380 is configured to receive messages transmitted by a mobile phone on a message service for transmission via the radio appliance interface 360. In one embodiment, the SMS module 380 receives the messages directly. In another embodiment, the SMS module 380 receives the messages by way of a virtual number provider. In either instance, the SMS module 380 parses the message to identify the text data for transmission and the radio/channel to broadcast the data. In one embodiment, the SMS module 380 translates the text data to speech audio for transmission. In another embodiment, the SMS module 380 identifies a transmitting function indicated in the text data. In turn, the SMS module 380 translates the text data based on the transmitting function of a radio, such as for a maritime emergency broadcast. In such instances, the SMS module 380 may parse the text data for GPS coordinates and/or other data specific to the transmitting function.

The cataloger 370 stores and retrieves stored data for the modules of the web appliance 150 as described above. For example, the cataloger 370 may store information received at the radio appliance interface 360 from a radio appliance and retrieve the information when requested by the web interface 330 or the application interface 340. In one embodiment, the cataloger 370 maintains a table of radio appliances and their associated information. For example, the cataloger 370 may store network address information for a radio appliance, radio/port information for the radio appliance, available channels for each radio connected to the appliance, current channel for each radio, an indication of whether the channel may be changed, and information about the communications (e.g., audio file location, transcript file location, time, location if submitted to the web appliance by a mobile device, etc.) through each channel.

Officer Device

Figure 4:
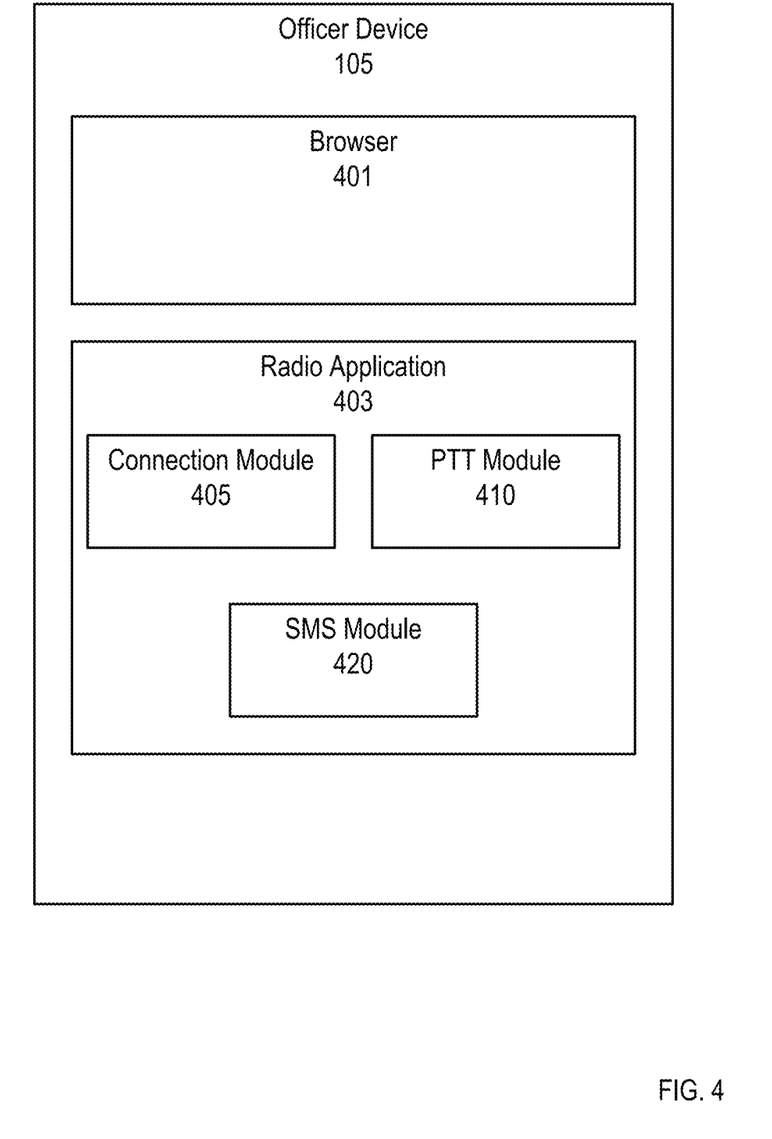
FIG. 4 is a block diagram illustrating example modules of an officer device according to one example embodiment.

FIG. 3 is a block diagram illustrating example modules of an officer device 105 according to one example embodiment. As mentioned above, the officer device 105 may access a network such as the internet to retrieve data from and transmit data to a web appliance. Additionally, in some embodiments, the officer device 105 may be configured as a radio appliance and connected to a radio to transmit broadcast information received from the radio to the web appliance.

In one embodiment, the officer device 105 includes a browser application 401. A user of the officer device 105 may utilize the browser 401 while connected to the network to navigate a webpage provided by the web appliance (e.g., via a web interface). In turn, the user interacts with the web appliance through the webpage displayed by the browser 401 to receive and transmit communications over non-cellular frequencies.

In one embodiment, the officer device 105 includes a radio application 403. The radio application 403 when executed exchanges information with the web appliance (e.g., through a radio application interface). In one embodiment, the radio application 403 accesses an API of the web appliance to exchange information. For example, the radio application 403 may request information from the web appliance via the API and transmit information for the web appliance via the API. The radio application 403 requests and transmits the information in response to user interactions with a user interface generated by the radio application 403. Additionally, the radio application 403 may receive information and notifications in real-time pushed to the radio application by the web appliance through the API.

The radio application 403 user interface enables a user to navigate the different radios and channels available through the API. In order to access some radios, channels and/or transmit privileges, the user may provide authentication information (e.g., logging in/registering and providing an authentication code) to the radio application 403, which transmits the authentication information to the web appliance. If the authentication information is denied, the radio application 403 receives a notification and displays the denial to the user. If the authentication information is accepted, the radio application 403 receives information about the radios and channels the user is permitted access to and generates an interface displaying their availability. In turn, a user may select a particular channel/radio to begin monitoring the communications associated therewith. The user may choose to listen live or retrieve historical communications. Additionally, the interface for the particular channel/radio may display operations available to the user through the radio application, such as whether they are permitted to transmit audio for broadcast, transmit a radio function (e.g., a distress signal), transmit text for broadcast, and change the channel.

In some embodiments, the radio application 403 includes a connection module 405 configured to establish a real-time audio connection though the API of the web appliance. For example, the radio application 403 may request to open a VoIP connection with the web appliance to facilitate the real-time transmitting of voice data associated with a radio/channel the user browses to in the radio application 403 interface. In this way, the connection module 405 receives audio communications in real time from the web appliance for the selected channel. The connection module 405 may listen for a PTT active notification from the PTT module 410 that indicates the user desires to transmit on the channel. In turn, the connection module 405 begins passing audio collected from a microphone of the officer device 105 over the VoIP connection to the web appliance until receiving a PTT inactive notification from the PTT module 410.

In some embodiments, the connection module 405 manages a connection that interfaces a radio with a web appliance to configure the officer device 105 as radio appliance. In one embodiment, the connection module 405 provides the option for the user to set up a private channel. When the user selects the option, the connection module 405 registers the officer device 105 with the web appliance (e.g., through the radio appliance interface). In turn, the user may input information about their channel/radio and optionally specify authentication information for the channel. The connection module 405 transmits the information to the web appliance and opens a connection such as a VoIP connection to the web appliance. In some embodiments, the radio application 403 user interface displays a unique channel ID for the user to provide to others along with any required authentication code. The user may then configure the officer device with the radio as described in FIG. 2B to begin providing information from radio transmissions over the VoIP connection to the web appliance and optionally receive communications from other users monitoring the channel.

The PTT module 410 detects user input to transmit PTT active and PTT inactive notifications to the connection module 403. In one embodiment, the PTT module 410 monitors a user interface element of the radio application 403, such as a PTT button, to detect when the user activates (e.g., touches) and deactivates (e.g., ceases to touch) the button. In another embodiment, the PTT module 410 interfaces with the officer device 105 to detect user interactions with a physical hardware element of the officer device specified as a PTT button, such as a volume up button that provides the user with tactile feedback. In this case, the PTT module 410 monitors the status of the physical hardware element to detect when the user activates (e.g., presses) and deactivates (e.g., releases) the button. In either configuration, when the user activates the PTT button the PTT module 410 notifies the connection module 405 that PTT is active, and when the user deactivate the PTT button the PTT module 410 notifies the connection module 405 that PTT is inactive. After releasing the PTT button, the audio captured by the microphone of the officer device 105 is transmitted over the device's cellular data or WiFi connection by the connection module 405 to the web appliance or streamed over Voice-over IP (VoIP), WebRTC, or other Real-time Transport Protocol (RTP) connection.

The setting to enable on the hardware PTT may disable native OS features of the officer device 105 associated with the hardware PTT button that would interfere with audio collection or may be undesired. For example, when using a volume up button as a PTT button, a change of volume/setting and/or audible alerts associated with activating the volume up button may be disabled when the button is depressed. In one embodiment, the native OS features are selectively disabled for long presses and short presses, i.e., a short press of the volume up button would still cause the volume setting to increase but not for a longer press (e.g., greater than a second) when audio would be collected. In one embodiment, when PTT module 410 detects the user desires to communicate with the hardware PTT button (e.g., upon engagement or being engaged for a sufficiently long time such as 1 second), the PPT module 410 generates an audible queue indicating that audio is being collected and the user may begin speaking Some radios, such as marine radios, have specific transmit functions to broadcast digital information over reserved channels. For example, a feature named Digital Selective Calling (DSC) is used when a boater presses a distress button on the radio, sending the boater's Maritime Mobile Service Identity (MMSI) code digitally to the nearest coast guard. If the boater previously registered their MMSI code, it can be used by the coast guard to look up information such as the name of the vessel and passenger emergency contact numbers. Similar non-audio mechanisms exist for public safety radios. The radio application 403 may provides users with the ability to transmit these same digital signals. For example, the radio application 403 may generate an interface including the various transmit functions available to the user. When the user presses a button corresponding to a particular function, the function and any additional information (e.g., GPS coordinates) are transmitted to the web appliance via the API.

In some instances, a network connection may not be available to the officer device 105. For example, the officer device 105 may be located far from a cellular tower, in a weak area of reception, or in a mass emergency where cell towers are congested. Oftentimes, even in such circumstances, a text message on the short message service may go through to a cell tower. To take advantage of the reliability of SMS, the SMS module 420 may generate a text message indicating the digital/distress signal, radio/channel, and including associated information such as GPS coordinates of the device. The SMS module 420 attempts to send the message to a telephone number, such as a virtual phone number stored by the SMS modules 420 and associated with the web appliance. The SMS module 420 automatically attempts to send the message for the transmit function, including information such as a unique identifier for the user, latitude and longitude (i.e. "ID0004518, 27.772325N, 82.782601W").

Figure 5A:
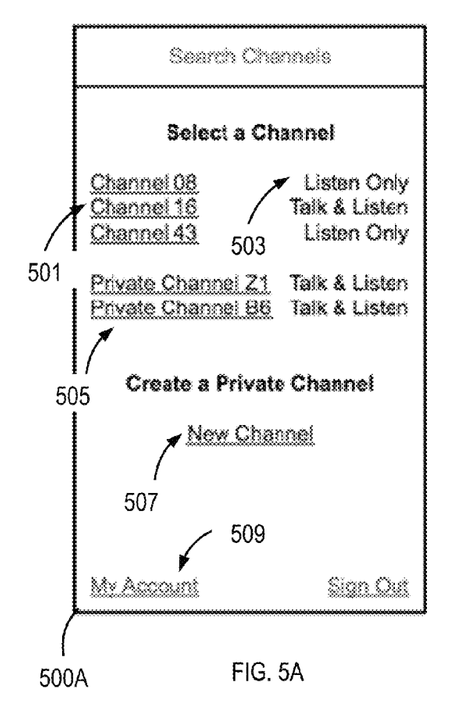
FIGS. 5A, 5B, and 5C illustrate example interfaces displayed on a mobile phone for receiving and transmitting over non-cellular radio frequency channels, according to some embodiments.
Figure 5B:
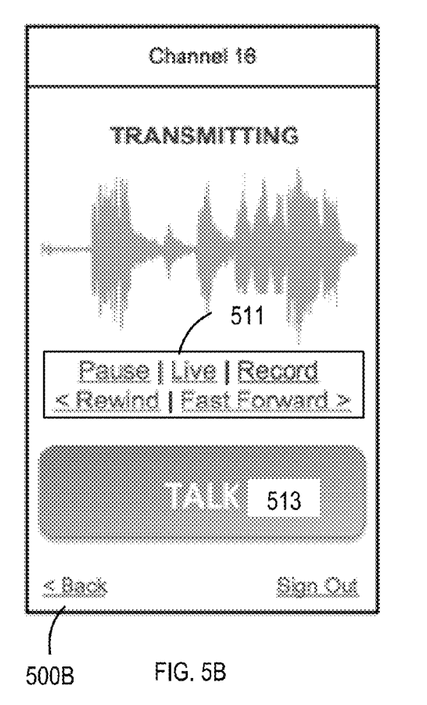
Figure 5C:
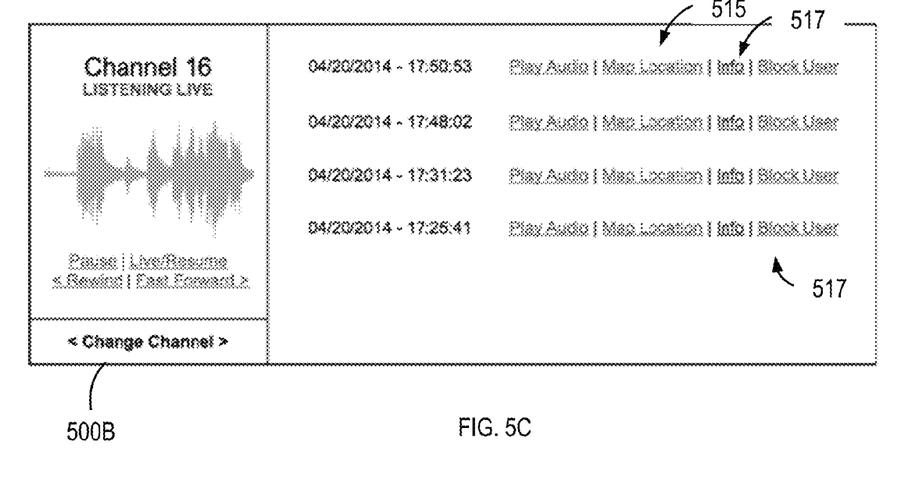

FIGS. 5A, 5B, and 5C illustrate example interfaces displayed on a mobile phone for receiving and transmitting over non-cellular radio frequency channels, according to some embodiments. A mobile phone, such as an officer device, may access the examples interfaces from a web appliance through a browser application. Alternatively, a radio application executing on the officer device may generate the interfaces based on information retrieves from an API of a web appliance.

Turning first to FIG. 5A, interface 500A illustrates a channel selection screen. The channels populating the channel selection screen may include those which the device and/or user are authorized to listen and/or transmit on. For example, a user may log into an account 509 and provide authentication information. The channel selection interface 500A illustrates channels 501 available to the user and their privileges 503 for each channel, e.g., listen only to receive broadcasts or talk and listen to receive and transmit broadcasts for a channel. In some embodiments, the interface 500A may include private channels 505 corresponding to broadcasts from radios connected to a mobile phone (e.g., and officer device) configured as a radio appliance. Additionally, the interface 500A may present the user with the option to create 507 their own private channel and configure their mobile phone as a radio appliance. In response to the user selection of a channel, e.g., radio channel 501 16, an interface is generated for the channel.

FIG. 5B illustrates an example channel interface 500B for radio channel 16. The channel interface 500B includes playback options 511 for playback of received broadcasts on the channel. For example, the user may pause, record, rewind, or fast forward through received broadcasts. Additionally, the user may select live to receive broadcasts in real time. In instances where the user and/or device has transmit privileges on the channel, a push to talk button 513 may be displayed in the interface. The user, in turn, may activate the button 513 to transmit on the channel. In embodiments where a hardware element of the device is configured for push to talk functionality, the interface may display a notification such as "hold down volume up button to transmit."

FIG. 5C illustrates an example channel interface 500C for radio channel 16 with administrator privileges. As described previously, users with administrator privileges for a channel may manage other devices' privileges. Thus for example, an administrator may block 517 a particular device/user from transmitting on the channel. Additionally, the administrator may review location information 515 collected in association a device's transmission on the channel as well as review information 517 about the device.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system for enabling a mobile phone to transmit and receive on non-cellular radio frequency channels, the system comprising:
   a radio appliance, the radio appliance comprising:
   a first connection to a radio, the first connection configured to receive audio and channel information from the radio, the audio corresponding to a broadcast on the channel over a non-cellular radio frequency; and
   a second connection to a server, the second connection configured to transmit the audio and channel information received from the radio to the server over a network; and
   a server comprising one or more processors and a non-transitory computer-readable storage medium storing computer program code, the computer program code when executed by the one or more processors causing the server to:
   receive the audio and channel information from the radio appliance over the second connection;
   catalog the audio received from the radio appliance according to the channel over which the audio was broadcast on the non-cellular frequency;
   receive a request from a mobile device to access the channel over the network;
   transmit the audio to the mobile device over the networks;
   queue information received from the mobile device for broadcast on the channel over the non-cellular radio frequency;
   monitor the second connection to detect a silent line when the audio is not actively being received from the radio appliance; and
   in response to detecting the silent line and responsive to a position of the information received from the mobile device in the queue, transmit the information received from the mobile device over the network to the radio appliance for broadcast on the non-cellular radio frequency.

2. The system of claim 1, wherein the second connection to the server is a Voice Over Internet Protocol (VoIP) connection.

3. The system of claim 1, wherein the server catalogs a network address of the radio appliance on the network.

4. The system of claim 3, wherein in response to receiving the information for broadcast from the mobile device, the server identifies the network address of the radio appliance based on its associated with the radio for broadcasting on the channel over the non-cellular radio frequency.

5. The system of claim 3, wherein the information includes a location of the mobile device, the computer program code when executed performing further operations to:
   authorize transmission of the information over the network to the radio appliance in response to determining the location of the mobile device is within an authorized transmitting area.

6. The system of claim 3, wherein the second connection of the radio appliance to the server is further configured to receive the information from the server, the radio appliance further comprising:
   a signal generator, the signal generator configured to generate a signal in response to receiving the information.

7. The system of claim 6, wherein the first connection to the radio is further configured to provide the signal and the second information to the radio for broadcast on the channel over the non-cellular radio frequency.

8. The system of claim 1, wherein the information includes audio and identifies the channel on the non-cellular radio frequency for broadcasting the audio.

9. A system for enabling a mobile phone to transmit and receive on non-cellular radio frequency channels, the system comprising:
- a server comprising one or more processors and a non-transitory computer-readable storage medium storing computer program code, the computer program code when executed by the one or more processors causing the server to:
  - receive information for broadcast over a non-cellular radio frequency channel from a mobile device;
  - identify a radio appliance associated with a radio for broadcasting over the non-cellular radio frequency channel;
  - queue the information received from the mobile device for broadcast by the radio over the non-cellular frequency channel;
  - monitor a first connection to a radio appliance over a network to detect a silent line when audio is not actively being received from the radio appliance; and
  - in response to detecting the silent line and responsive to a position of the information received from the mobile device in the queue, transmit the information received from the mobile device over the network to the radio appliance for broadcast by the radio on the non-cellular radio frequency.
- a radio appliance, the radio appliance configured to:
  - receive, over the network on the first connection, the information for broadcast over the non-cellular radio frequency channel;
  - generate a signal in response to receiving the information; and
  - provide the signal and the information to the radio over a second connection to broadcast, by the radio, the information received from the mobile device over the non-cellular radio frequency channel.

10. The system of claim 9, wherein the received information for broadcast includes audio.

11. The system of claim 9, wherein the first connection between the server and the radio appliance is a Voice Over Internet Protocol (VoIP) connection.

12. The system of claim 9, wherein the information received from the mobile device for broadcast includes location information, the received information indicating a radio function for broadcasting the location.

13. The system of claim 12, wherein the information received from the mobile device for broadcast is included in a message transmitted over a short message service by the mobile device.

14. The system of claim 9, wherein identifying the radio appliance comprises identifying a network address of the radio appliance associated with the radio for broadcasting over the non-cellular radio frequency channel.

15. The system of claim 9, wherein the information includes a location of the mobile device, the computer program code when executed performing further operations to:
- authorize transmission of the information over the network to the radio appliance in response to determining the location of the mobile device is within an authorized transmitting area for the non-cellular radio frequency channel.

16. The system of claim 9, wherein the second connection of the radio appliance to the radio is configured to receive second information from the radio included in a broadcast over the non-cellular radio frequency channel, and the radio appliance is configured to transmit the second information received from the radio to the server on the first connection over the network.

17. The system of claim 16, wherein the server further comprises computer program code that when executed performs operations to:
- receive the second information from the radio appliance over the second connection, the second information including audio and channel information;
- catalog the audio received from the radio appliance according to the channel over which the audio was broadcast on the non-cellular frequency;
- receive a request from a mobile device to access the channel over the network; and
- transmit the audio received from the radio appliance to the mobile device over the network.

18. The system of claim 17, wherein the server catalogs a network address of the radio appliance on the network received in the second information.

* * * * *

UNITED STATES PATENT AND TRADEMARK OFFICE
CERTIFICATE OF CORRECTION

PATENT NO. : 9,813,884 B2
APPLICATION NO. : 14/946072
DATED : November 7, 2017
INVENTOR(S) : Christopher Ryan Bennett Page 1 of 1

It is certified that error appears in the above-identified patent and that said Letters Patent is hereby corrected as shown below:

In the Claims

Column no. 18, Line 44 Claim 4, "associated" to read -- association --

Signed and Sealed this
Tenth Day of July, 2018

Andrei Iancu
*Director of the United States Patent and Trademark Office*